Figure 1:
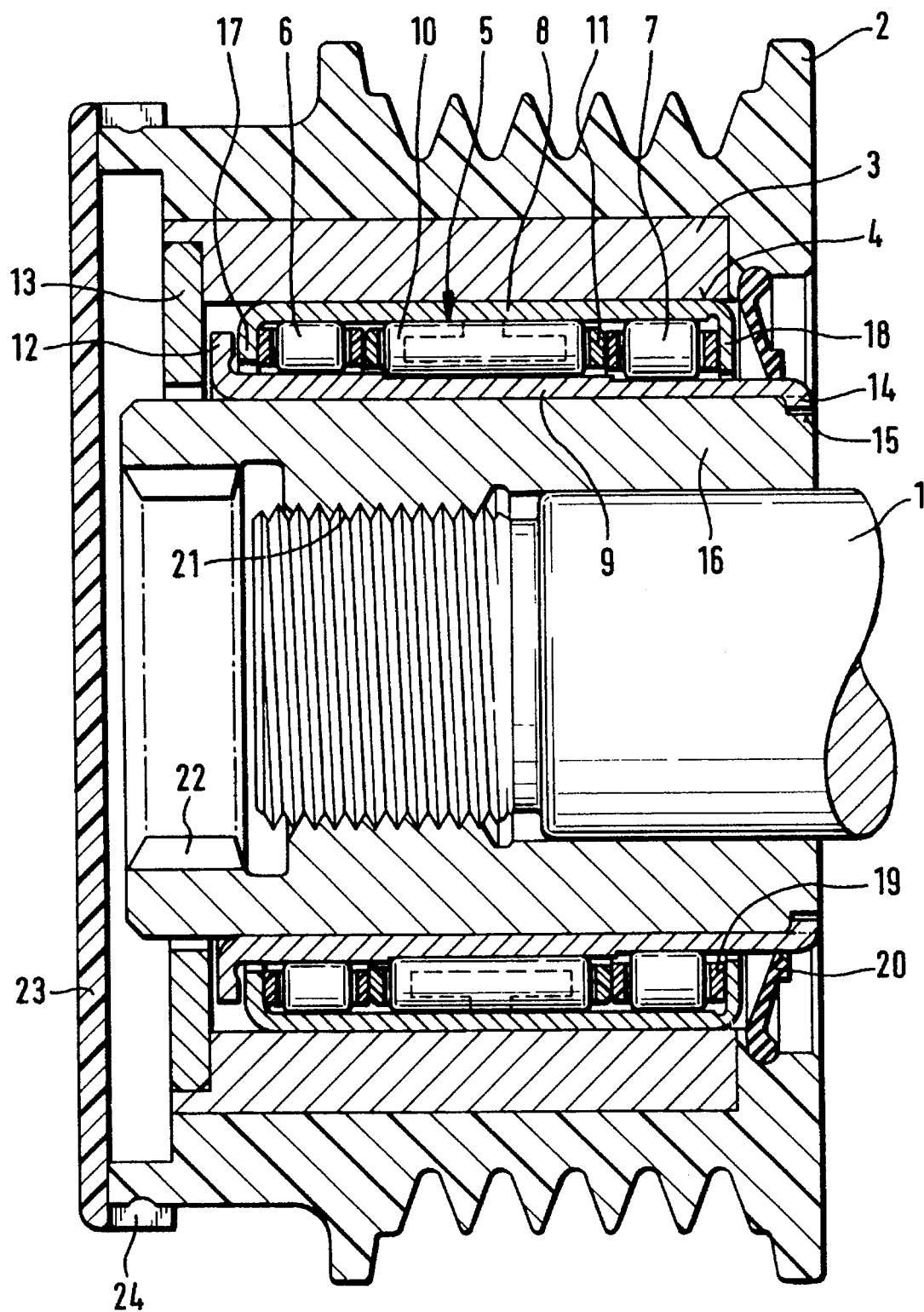

United States Patent [19]
Wagner et al.

[11] Patent Number: 5,517,957
[45] Date of Patent: May 21, 1996

[54] DEVICE FOR DAMPING TORSIONAL VIBRATIONS IN A DRIVE TRAIN

[75] Inventors: Jörg Wagner, Rottenbach; Norbert Bethke, Höchstadt/Aisch; Ernst Neuwirth, Herzogenaurach; Henrik Brehler, Aurachtal; Rudolf Polster, Baiersdorf; Sigurd Wilhelm, Weisendorf, all of Germany

[73] Assignee: INA Walzlager Schaeffler KG, Herzogenaurach, Germany

[21] Appl. No.: 526,627

[22] Filed: Sep. 11, 1995

[30] Foreign Application Priority Data

Oct. 22, 1994 [DE] Germany .................. 9417045 U

[51] Int. Cl.⁶ .................................................. F02B 77/00
[52] U.S. Cl. ........................... 123/192.1; 123/198 R
[58] Field of Search .......................... 123/192.1, 198 R

[56] References Cited

U.S. PATENT DOCUMENTS

| 4,617,884 | 10/1986 | Allen et al. ............. | 123/192.1 |
| 5,184,582 | 2/1993 | Okui et al. ............. | 123/90.31 |
| 5,452,781 | 9/1995 | Eckel ..................... | 192/30 V |

FOREIGN PATENT DOCUMENTS 3610415  3/1988  Germany .
4-307153 10/1992  Japan .

Primary Examiner—David A. Okonsky
Attorney, Agent, or Firm—Bierman and Muserlian

[57] ABSTRACT

A device for damping torsional vibrations in a drive train of a traction drive connecting an internal combustion piston engine and an auxiliary unit, comprising an overrunning clutch (5,30,48) arranged between a driving pulley (2,25,42) and an input shaft (1) of the auxiliary unit or between a crankshaft and a driven pulley of the internal combustion piston engine, characterized in that the overrunning clutch (5,30,48) comprises an inner or outer ring (8,9,28,29,50) made of sheet metal without chip removal on which locking ramps cooperating with locking rollers (10,30a,48a) are formed, and the inner or outer ring (8,9,28,29,50) extends at least on one side beyond a region of the locking ramps to form a raceway for a rolling bearing (6,7,31,32,45,49).

23 Claims, 3 Drawing Sheets

DEVICE FOR DAMPING TORSIONAL VIBRATIONS IN A DRIVE TRAIN

STATE OF THE ART

A device for damping torsional vibrations in a drive train, particularly in a traction drive connecting an internal combustion piston engine and an auxiliary unit, comprising an overrunning clutch arranged between a driving pulley and an input shaft of the auxiliary unit or between a crankshaft and a driven pulley of the internal combustion piston engine is known from DE-A 36 10 415. This device aims at reducing torsional vibrations produced by the cyclic irregularities of the internal combustion piston engine in the drive belt of the drive train, usually made as a traction drive, for an auxiliary unit. For this purpose, an overrunning clutch is provided either between a crankshaft of the internal combustion piston engine and a drive pulley disposed on the crankshaft, or between a driving pulley and an input shaft of the auxiliary unit.

JP-A-04-30 71 53 discloses a drive for a generator in which the driving pulley is connected rotationally fast to a flywheel, and an overrunning clutch is arranged between an annular hub of the flywheel and an input shaft. This configuration of the device leads to an undesired increase of the overall dimensions of the drive of the auxiliary unit, while the flywheel acting as an additional mass disadvantageously increases the moment of impact on the overrunning clutch. Besides this, such an arrangement is not suitable for re-equipping commercially available auxiliary units such as three-phrase generators, air-conditioning compressors etc. with such a torsional vibration damping device without serious modifications being made to the auxiliary unit. Moreover, the prior art device has a complicated structure and is not suited for manufacture in large numbers.

OBJECTS OF THE INVENTION

It is an object of the invention to provide a device of the pre-cited type configured so that it can be installed in a given limited design space by simple structural measures while also guaranteeing a troublefree operation of the auxiliary unit concerned.

This and other objects and advantages of the invention will become obvious from the following detailed description.

THE INVENTION

The device of the invention for damping torsional vibrations in a drive train of a traction drive connecting an internal combustion piston engine and an auxiliary unit, comprising an overrunning clutch (5,30,48) arranged between a driving pulley (2,25,42) and an input shaft (1) of the auxiliary unit or between a crankshaft and a driven pulley of the internal combustion piston engine, is characterized in that the overrunning clutch (5,30,48) comprises an inner or outer ring (8,9,28,29,50) made of sheet metal without chip removal on which locking ramps cooperating with locking rollers (10,30a,48a) are formed, and the inner or outer ring (8,9,28,29,50) extends at least on one side beyond a region of the locking ramps to form a raceway for a rolling bearing (6,7,31,32,45,49).

The device of the pre-cited type achieves this object by the fact that the overrunning clutch comprises an inner or an outer ring made of a sheet metal without chip removal on which locking ramps cooperating with locking rollers are formed, and the inner or outer ring extends at least on one side beyond the region of the locking ramps to form a raceway for a rolling bearing. According to the invention, the inner or outer ring, as the case may be, can be made together with its locking ramps and raceways in a single deep drawing operation. The configuration as a shaped sheet metal part offers the advantage not only of economic manufacturing but also that, due to its thin-walled structure, the inner or outer ring possess an elasticity which permits a gentle coupling of the overrunning clutch. Due to the high belt forces, it is further required that the driving pulley be mounted on the shaft so as to be parallel to the overrunning clutch. The use of the same components for the overrunning clutch and the rolling bearing, i.e. the provision of a common inner or outer ring, makes further economic developments of the device possible.

Rolling bearings are arranged preferably on each side of the overrunning clutch and these rolling bearings are advantageously in the form of needle roller bearings because they require only a small radial design space. In a preferred embodiment of the device, the locking ramps are made on the inner ring because, in this case, the centrifugal force acting on the locking rollers when the driving pulley rotates intensifies the locking action.

Further, if rolling bearings are provided on both sides of the region of the locking ramps, one of these rolling bearings can be a ball bearing and the other, a needle roller bearing. Advantageously, an appropriate ring of balls in the ball bearing can also absorb axial guiding forces so that an abutment of the driving pulley against the hub or against the flanges of the inner and the outer ring is avoided.

As already mentioned, the device for damping torsional vibrations is intended to be installed, as far as possible, in an already existing design space, that is to say, by using an existing component as a carrier. Advantageously, the assembled unit comprised of the overrunning clutch and the rolling bearings is arranged within the axial extent of the driving pulley. Thus, when using the device of the invention, no additional axial design space is required and a standard auxiliary unit drive can be re-fitted with such a driving pulley comprising a damping device without further structural modifications to the drive.

In another feature of the invention, the inner ring comprising the locking ramps is pressed on to a hub, and a radially outwards oriented flange arranged preferably on the end of the inner ring facing the auxiliary unit engages behind a cage of the rolling bearing. For an exact fixing of the inner ring on the hub connected to the input shaft, the inner ring can comprise a radially inwards oriented shoulder which preferably bears against an end face of the hub facing away from the auxiliary unit or extends with a defined axial play relative to this end face.

Another embodiment of the invention comprises an outer ring made without chip removal from sheet metal. This outer ring is pressed into a bore of the driving pulley and forms raceways for the locking rollers and rolling elements. A first radially inwards oriented flange of the outer ring engages the flange of the inner ring, while a second radially inwards oriented flange arranged preferably on an end of the outer ring facing away from the auxiliary unit engages around a cage of the rolling bearing.

The described features involving only simple structural measures permit an exact axial fixing of the components of the device as well as a precise guidance of the driving pulley relative to the hub. Moreover, the flanges of the inner and the outer ring also serve to seal the device and prevent dirt particles from penetrating into the rolling bearings and the overrunning clutch. For this purpose, the flanges engage each other with play so that a labyrinth seal is formed. Advantageously, a sliding seal cooperating with the outer peripheral surface of the inner or the outer ring can be arranged on the opposite end of the device on the flange of the outer ring or on a cage of the rolling bearing. An axial play is provided between the flange of the inner ring and the adjacent first flange of the outer ring. Appropriately dimensioned, this play permits the correction of alignment errors between the driving pulley and a driven pulley of the crankshaft. Such alignment errors would otherwise lead to a premature wear of the drive belt connecting the two pulleys.

An exact and low-friction guidance of the driving pulley relative to the hub as well as a further improvement of the labyrinth action of the seal can be obtained by inserting a stop disc into the bore of the driving pulley to bear both against an end face of the hub and against an end face of the first flange.

In a further embodiment of the invention, the driving pulley is made of a plastic material and its periphery has a grooved profile which profile permits the transmission of relatively high drive moments without slip. Preferably, this grooved profile extends over almost the entire design length of the device so that the radial forces transmitted to the device via the drive belt can be advantageously transmitted uniformly to both radial bearings serving as mounting supports. The mounting arrangement in the aforementioned prior art JP-A-04-03-71-53, in contrast, disadvantageously extends beyond the region of the belt pulley on one side, thus giving rise to unfavorable force application to the mounting points. Due to the fact that the driving pulley is made of a plastic material, it can be manufactured as a simple injection molded part and produces only low inertia forces.

According to another embodiment of the invention, the inner ring can be pot-shaped and fixed directly to the input shaft while an inwards drawn bottom of this inner ring comprises a through-bore for fixing the input shaft. The use of such a pot-shaped inner ring allows a separate hub to be dispensed with. The deep-drawn inner ring comprises chiplessly formed ramps and, if necessary, also chiplessly made grooves to serve as raceways for a ball bearing. Raceways can likewise be made directly on the bore of the driving pulley.

As an alternative to the sealing of the assembled unit by a labyrinth seal as described above, a sealing of the assembled unit can also be effected by two radial sealing rings, each of which is arranged externally of one of the two rolling bearings and thus prevents the penetration of dirt into the assembled unit.

Further, the inner ring has a stepped wall thickness, and an outer diameter of the inner ring at the raceway adjacent the flange is substantially equal to an outer diameter at the locking ramps and this latter outer diameter is larger than the outer diameter at the raceway of the second rolling bearing. If the outer diameter is measured at the bottom of pockets made in the inner ring for lodging the locking rollers, this outer diameter is also larger than the outer diameter at the last-mentioned raceway. Such a stepped configuration is conducive to the mounting of the two rows of rolling elements and the row of locking rollers on the inner ring because it enables not only the inner row of rolling elements to be pushed over the ramps, but also the locking rollers to be inserted into their pockets over the raceway of the outer rolling bearing. This configuration offers the further advantage that the cages of the overrunning clutch and the outer rolling bearing are supported on the step-like projections.

To prevent dirt from entering the entire drive belt assembly, a cap, preferably of a plastic material, is arranged so as to surround the driving pulley at a front end thereof facing away from the auxiliary unit, and an axially oriented rim of the cap interlocks with the periphery of the driving pulley.

Further, the inner and/or outer ring is secured against rotation on the hub and/or the driving pulley by positive engagement means. A fixing by positive engagement can be effected, for example, if the radially inwards oriented shoulder of the inner ring comprises recesses which engage into recesses of the hub. Further possibilities of obtaining a security against rotation are to arrange regularly spaced fixing pins on the periphery of the end face of the hub which fix the shoulder of the inner ring to prevent it from turning, or to have individual sections of the shoulder engage into bores on the end face of the hub.

The hub has an inner toothing, particularly a serration toothing, and is made preferably as flow-formed part. This serration toothing arranged next to a threaded portion serves as a point of application for a mounting tool. Besides this, all components of the device made of steel are provided with an anti-corrosive coating of a zinc-nickel alloy or a zinc-iron alloy. This anti-corrosive coating, which is applied to the components by electrodeposition, is also provided in the region of the raceways and the ramps of the inner and the outer ring, and the thickness of the coating is approximately equal to the roughness depth of the surface concerned.

REFERRING NOW TO THE DRAWINGS

Figure 2:
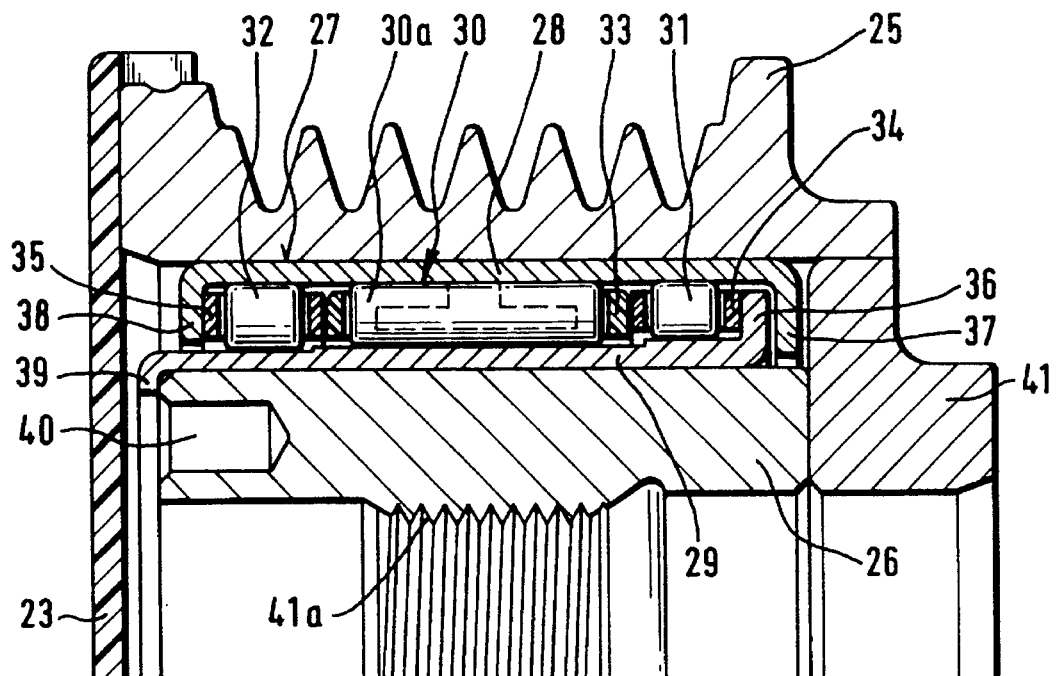
Figure 3:
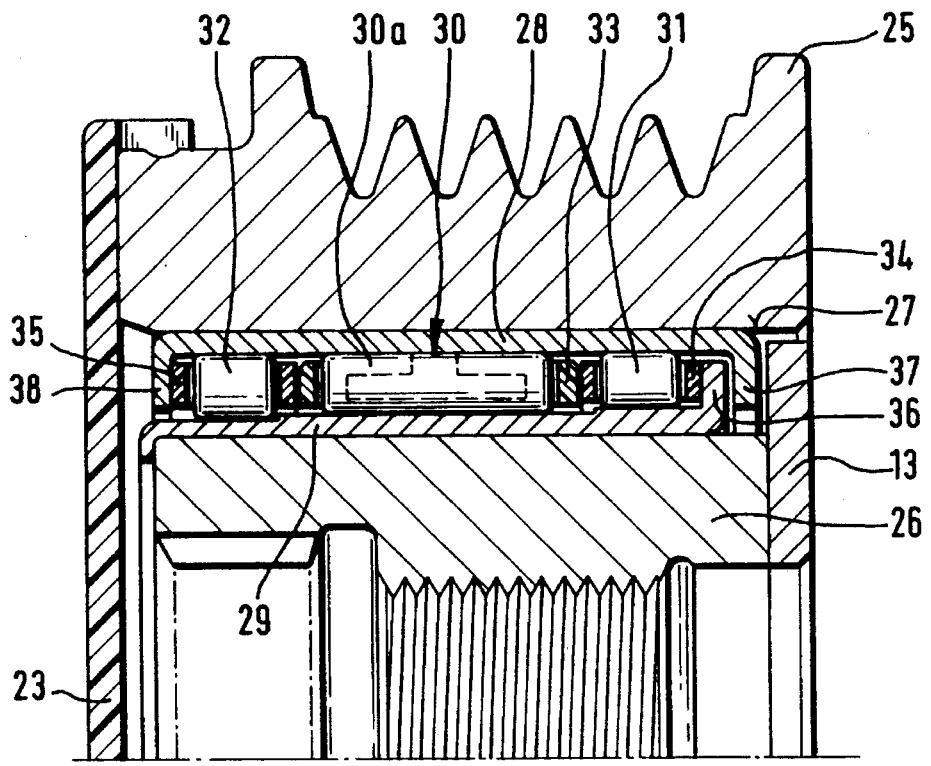
Figure 4:
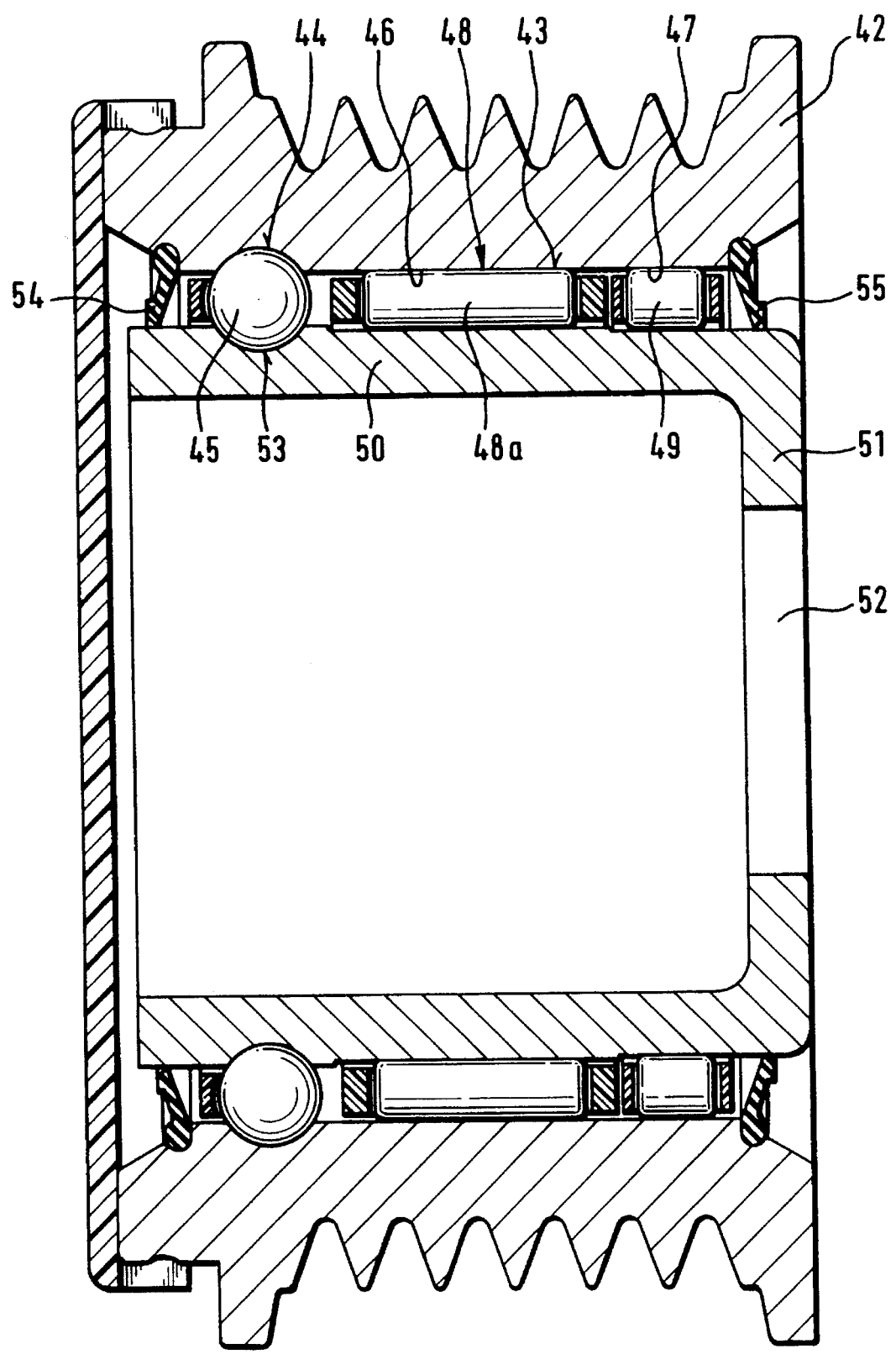

FIG. 1 is a longitudinal cross-section through a driving pulley for the drive of an auxiliary unit comprising cylindrical roller bearings arranged on each side of an overrunning clutch, FIG. 2 is a partial longitudinal cross-section through another embodiment of a driving pulley in which an inner ring of a damping device of the invention is fixed on a hub by positive engagement, FIG. 3 is a partial longitudinal cross-section of another arrangement which corresponds substantially to that of FIG. 2, and FIG. 4 is a longitudinal cross-section through a driving pulley in which a ball bearing is arranged on one side of an overrunning clutch and a cylindrical roller bearing is arranged on the other side thereof.

In FIG. 1, an input shaft forms, for example, a part of a three-phase generator or an air conditioning compressor and is driven via a driving pulley (2) and a drive belt, not shown, of a driven pulley connected to a crankshaft of an internal combustion piston engine. Such an arrangement of a driving pulley, a drive belt and a driven pulley can be seen, for example, in FIG. 3 of DE-A 36 10 415. The driving pulley (2) is made of a plastic material and comprises an inner armoring ring (3). An assembly comprised of an overrunning clutch (5) and two cylindrical roller bearings (6) and (7) is inserted into the bore (4) of the armoring ring (3). The assembly comprises a common outer ring (8) and a common inner ring (9). On the periphery of the inner ring (8) are arranged a plurality of mutually spaced locking ramps, not shown, which cooperate with a corresponding number of locking rollers (10). These locking rollers are guided in a cage (11) and urged against the locking ramps by springs, not shown. The outer ring (8) is substantially bush-shaped and has a constant inner diameter over its entire length to form raceways for the cylindrical roller bearings (6) and (7) and the locking rollers (10).

At its end facing away from the auxiliary unit, the inner ring (9) comprises a radially outwards oriented flange (12) whose end is supported on a stop ring (13) fixed in the armoring ring. At its opposite end, the inner ring (9) comprises a shoulder (14) which has, for example, a tooth-like configuration and engages into individual longitudinal grooves (15) provided on a hub (16). At one of its ends, the outer ring comprises a first flange (17) around which the flange (12) of the inner ring (9) engages. A second flange (18) of the outer ring, arranged on an end thereof facing towards the auxiliary unit, engages around a cage (19) of the cylindrical roller bearing (7). A radial sealing ring (20) forming a sliding seal with the inner ring (9) is arranged adjacent to this second flange (18) in the driving pulley which is made of a plastic material. For its fixing on the input shaft (1), the hub (16), comprises an inner thread (21) and, spaced therefrom, on the inside of the hub (16), there is provided a multitooth profile (22) in the form of a serration toothing which serves as a point of application for a mounting tool. At its end facing away from the auxiliary unit, the entire driving pulley (2) is sealed by a cap (23) comprising an axially projecting rim (24) which is snapped on to the periphery of the driving pulley (2).

The entire assembly comprised of the overrunning clutch (5) and the cylindrical roller bearings (6) and (7), whose common outer and inner rings (8) and (9) are made without chip removal, is located within the axial extent of the driving pulley (2). This results in a very compact construction. Another advantageous feature is the arrangement of the locking ramps on the inner ring because the high centrifugal forces acting on the locking rollers (10) assure the desired locking effect. A gap is formed between the flange (12) of the inner ring (9) and the first flange (17) of the outer ring (8) and between the first flange of the outer ring (8) and the stop disc (13). By this inter-engagement of the two flanges (12) and (17) in conjunction with the stop disc (13), a labyrinth-type sealing is created. Further sealing is obtained at the opposite end by the radial sealing ring (20). The play existing between the flanges (12) and (17) and between the flange (12) and the stop disc (13) additionally permits a correction of alignment errors of the driving pulley (2).

FIGS. 2 and 3 show further embodiments of the invention which are substantially similar to each other and, therefore, identical reference numbers are used to identify similar parts. A driving pulley (25) in FIGS. 2 and 3 can be coupled in one direction of rotation to a hub (26) while being mounted for free rotation thereon in the other direction of rotation. For this purpose, an assembly comprised of an outer ring (28), an inner ring (29), an overrunning clutch (30) with locking rollers (30a), and cylindrical rollers (31) and (32) is inserted into a bore (27) of the driving pulley (25). The locking rollers (30) are guided in a cage (33) and spring-urged against locking ramps, not shown, of the inner ring (29). While the cylindrical rollers (31) are guided in a cage (34), the cylindrical rollers (32) are lodged in a cage (35). The inner ring (29) comprises a radially outwards oriented flange (36) which engages around the cage (34) of the cylindrical rollers (31). This flange (36) is in turn surrounded by a first flange (37) of the outer ring (28), while a second flange (38) of the outer ring supports the cage (35) of the cylindrical rollers (32). Due to this inter-engagement of the flanges (36) and (37) with the formation of a gap, a labyrinth sealing is obtained which prevents a penetration of dirt into the interior of the bearing.

In the embodiment of FIG. 2, the inner ring (29) additionally comprises an inwards directed shoulder (39). At one front end, there are arranged on the periphery of the hub (26), a plurality of uniformly spaced pocket bores (40) to which a mounting tool is applied for screwing the hub (26) on an input shaft. The shoulder (39) can be fixed against rotation in these pocket bores or on alignment pins inserted therein. Besides this, the device of FIG. 2 also comprises a stop disc (41) which, as seen in a longitudinal cross-section, has an L-shaped outer contour. With the help of this stop disc (41), an axial distance dimension can be compensated and furthermore, the stop disc can be made to extend axially up to a bearing of the generator to cooperate with a radial sealing ring arranged in an end shield of the generator. On its inside, the hub (26) comprises a thread (41a) by which it is fixed on an input shaft, not shown, of the auxiliary unit.

In contrast to FIG. 2, the hub (26) and the stop disc (13) of FIG. 3 have a configuration similar to that shown in FIG. 1.

Finally, FIG. 4 shows an arrangement in which a running groove (44) for a ball bearing (45) and raceways (46) and (47) for locking rollers (48a) of an overrunning clutch (48) and for the cylindrical rollers (49) are formed directly in a bore (43) of a driving pulley (42). An inner ring (50) has a pot-shaped configuration with its bottom (51) comprising a fixing bore (52) through which an input shaft can be introduced and fixed by a screw connection. Locking ramps cooperating with the locking rollers (48a) are formed on the inner ring (50) which further comprises a running groove (53) in which the balls of the ball bearing (45) are guided. The entire assembly is sealed on both sides by radial sealing rings (54) and (55) which are inserted into the driving pulley and slide on the periphery of the inner ring (50). FIG. 4 further shows the configuration of the outer peripheral surface of the inner ring (50). This stepped configuration of the outer peripheral surface of the inner ring (50) is likewise implemented in the embodiments of FIGS. 1 to 3.

Various modifications of the device of the invention may be made without departing from the spirit or scope thereof and, it is to be understood that the invention is intended to be limited only as defined in the appended claims.

What we claim is:

1. A device for damping torsional vibrations in a drive train of a traction drive connecting an internal combustion piston engine and an auxiliary unit, comprising an overrunning clutch (5,30,48) arranged between a driving pulley (2,25,42) and an input shaft (1) of the auxiliary unit or between a crankshaft and a driven pulley of the internal combustion piston engine, characterized in that the overrunning clutch (5,30,48) comprises an inner or outer ring (8,9,28,29,50) made of sheet metal without chip removal on which locking ramps cooperating with locking rollers (10, 30a,48a) are formed, and the inner or outer ring (8,9,28,29, 50) extends at least on one side beyond a region of the locking ramps to form a raceway for a rolling bearing (6,7,31,32,45,49).

2. A device of claim 1 wherein the rolling bearing is a needle roller bearing (6,7,31,32,49) guided in a cage.

3. A device of claim 1 with rolling bearings arranged on both sides of the region of the locking ramps, and one of said rolling bearings which is situated in a region further away from the auxiliary unit than the locking ramps, is a ball bearing (45), while opposed, other of said rolling bearings is a needle roller bearing (49).

4. A device of claim 1 wherein an assembled unit comprised of the overrunning clutch (10,30,48) and the rolling bearings (6,7,31,32,45,49) is arranged within an axial extent of the driving pulley (2,25,42).

5. A device of claim 2 wherein the inner ring (29)

comprising the locking ramps is pressed on to a hub (26) and engages a cage (34) of the rolling bearing (31) by a radially outwards oriented flange (36).

6. A device of claim 2 wherein an outer ring (8) made without chip removal from sheet metal is pressed into a bore (4) of the driving pulley (2), said outer ring (8) forms raceways for the locking rollers (30) and the rolling elements (31,32) while a radially inwards directed flange (17) of said outer ring (8) engages around a cage of the rolling bearing (6), and a flange (12) of the inner ring (9) engages around said flange (17) of said outer ring (8).

7. A device of claim 5 wherein a first radially inwards directed flange (37) of an outer ring (28) engages around the flange (36) of the inner ring (29) while a second radially inwards directed flange (38) of the outer ring (28) engages around a cage (34) of the rolling bearing (32) at an end of the hub (26) located away from the auxiliary unit.

8. A device of claim 6 wherein an axial play exists between the flange (12) of the inner ring (9) and the flange (17) of the outer ring (8).

9. A device of claim 7 wherein an axial play exists between the flange (36) of the inner ring (29) and the first flange (37) of the outer ring (28).

10. A device of claim 6 wherein a stop disc (13) is connected rotationally fast to the driving pulley (2) and bears against the flange (12) of the inner ring (9).

11. A device of claim 7 wherein a stop disc (41) is connected rotationally fast to the hub (26) and bears against the first flange (37) of the outer ring (28).

12. A device of claim 1 wherein the inner ring (29) comprises a radially inwards directed shoulder (39) which bears against an end face of the hub (16,26) or extends with a defined axial play relative to said end face.

13. A device of claim 1 wherein the driving pulley (2) is made of plastic material.

14. A device of claim 1 wherein a periphery of the driving pulley (2,25,42) has a grooved profile.

15. A device of claim 1 wherein the inner ring (50) is pot-shaped and is fixed directly to the input shaft, while an inwards drawn bottom (51) of the inner ring (50) comprises a through-bore (52) for fixing the input shaft.

16. A device of claim 3 wherein an assembled unit comprised of the overrunning clutch (48) and the rolling bearings (45,49) is sealed by two radial sealing rings (54,55) arranged respectively externally of each rolling bearing (45,49).

17. A device of claim 1 wherein the inner ring (9,29,50) has a stepped wall thickness, and an outer diameter of the inner ring at the raceway adjacent to the flange (12,36) of the inner ring is substantially equal to an outer diameter at the locking ramps, and this latter outer diameter is larger than an outer diameter at the raceway of the other rolling bearing.

18. A device of claim 1 wherein an end face of the driving pulley (2,25,42) facing away from the auxiliary unit is surrounded by a cap (23) having an axially oriented rim (24) which interlocks with the periphery of the driving pulley.

19. A device of claim 1 wherein the inner and/or outer ring (8,9,28,29) are secured against rotation on the hub (26) and/or the driving pulley by positive engagement means (40).

20. A device of claim 1 wherein the hub (26) comprises a screw thread (41a) and is made preferably as a flow-formed part.

21. A device of claim 1 wherein all steel components of the device comprise an anti-corrosive coating.

22. A device of claim 21 wherein the anti-corrosive coating is comprised of a zinc-nickel alloy.

23. A device of claim 21 wherein the anti-corrosive coating is comprised of a zinc-iron alloy.

* * * * *